Nov. 6, 1962     E. F. JOY     3,062,911
TEMPLE PIECE FOR SPECTACLES HEARING AID
Filed May 23, 1960
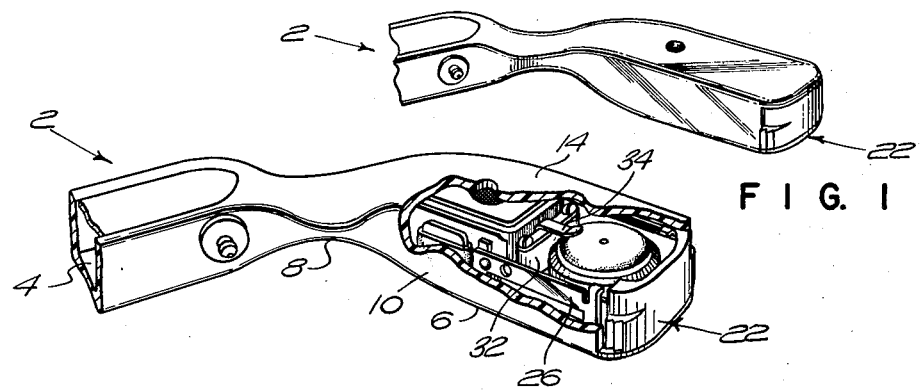
FIG. 1
FIG. 2
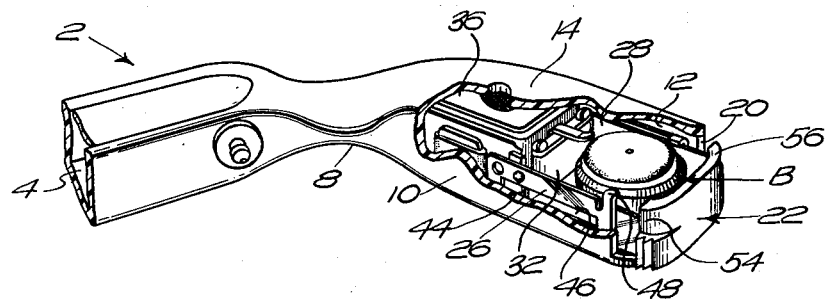
FIG. 3
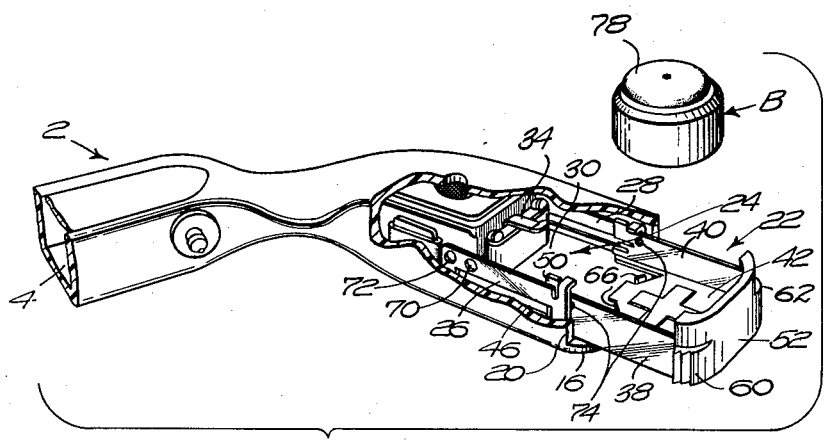
FIG. 4
INVENTOR.
ELLIS F. JOY
BY *Joseph Weingarten*
ATTORNEY 3,062,911
TEMPLE PIECE FOR SPECTACLES HEARING AID
Ellis F. Joy, Arlington, Mass., assignor to Audivox, Inc., Wilmington, Del., a corporation of Delaware
Filed May 23, 1960, Ser. No. 31,080
5 Claims. (Cl. 136—173)

This invention relates to hearing aids contained in eyeglass frames and more particularly to improved means for releasably containing a miniature battery in the temple piece of a spectacles hearing aid device.

As is well known, an entire hearing aid may be concealed within the temple piece of an eyeglass frame. The hearing aid generally comprises a microphone, an amplifier, a receiver, and a battery power supply. One of the chief advantages of concealing a hearing aid wholly within a temple piece is that binaural hearing assistance may be provided for the wearer, each temple piece having a separate hearing aid.

Although spectacles-concealed hearing aids have gained great favor, certain limitations and disadvantages have been noted with respect to the manner of mounting the battery power supply. Of course, the batteries are of miniature size. In addition, they usually are of disc or button shape, with one side functioning as the negative terminal and the other side functioning as the positive terminal. Heretofore, it has been customary to mount a battery in a recess formed in the temple and to provide some sort of hinged cover for the recess. Unfortunately, with this type of prior construction, insertion or removal of a battery has been an awkward task, particularly for elderly people. For one thing, the miniature battery is too easily dropped and, if it is of circular shape, it is not uncommon for a dropped battery to roll on the floor into a position where it is difficult to retrieve. Another problem has been the relative difficulty of determining the proper orientation of the battery in its temple piece receptacle. Although a battery has polarity markings, they are not sufficient by themselves to indicate how the battery is to be mounted within the temple piece. To make the desired polarized connections, the battery receptacle must contain matching polarity markings. Unfortunately, in prior constructions, space considerations have often precluded the use of markings in the temple piece of a size sufficiently great as to be readily legible. A third difficulty of prior construction relates to the problem of conserving battery power. Since a battery has a limited reservoir of power, some means is required to permit disconnection of the power supply from the hearing aid when the latter is not being used. Preferably, this must be done without physically removing the battery from the temple piece. In the past, the customary manner of achieving this is to utilize a gain potentiometer having an On-Off switch. The potentiometer is connected in the amplifier circuit so as to permit adjustment of the gain. However, this approach is expensive and suffers from the disadvantage that when the gain is turned way down, there is no visible indication of whether the set is off or on.

Another limitation of prior devices has been in the manner in which circuit connections have been made to the battery. Generally, the temple piece has been provided with resilient contacts which are engaged by the battery when the latter is inserted in the temple piece. Unfortunately, this type of construtcion is satisfactory only so long as the flexible contacts are not sprung or deformed out of their normal shape or position. Once they are deformed or sprung, the battery connection may not be adequate, with the result that the receiver output is erratic or zero.

The object of the present invention is to provide novel means for removably containing a battery in the temple piece of a hearing aid spectacles frame, which novel means are free of the limitations and deficiencies hereinabove noted with respect to prior devices of the same general nature.

Another important object of the present invention is to provide means for readily inserting and removing a miniature from the temple piece of a spectacle frame concealing a hearing aid device, with means being provided for disconnecting the battery from the hearing aid circuit without removing the battery from the temple piece and without employing a switch separate from the battery compartment.

Other objects and many of the attendant advantages of the present invention will become readily apparent when recourse is had to the following detailed specification when considered together with the accompanying drawings wherein:

FIG. 1 is a perspective view of a portion of a temple piece embodying the present invention;

FIG. 2 is an enlarged view of the element shown in FIG. 1, with a portion of the end being broken away to reveal the details of the battery compartment;

FIG. 3 is a view similar to FIG. 2 but with the battery drawer slightly pulled out so as to disconnect the battery from the hearing aid circuit; and FIG. 4 is a view similar to FIGS. 2 and 3 but showing the drawer fully pulled out and with the battery removed from the drawer.

Turning now to FIGS. 1 and 2, there is illustrated a portion of a temple piece 2 which is hollowed out as shown at 4 to accommodate the various components of a miniaturized hearing aid. With the exception of certain ones hereinafter disclosed, most of these hearing aid components are omitted deliberately since they form no part of the present invention. The temple piece is generally made of a suitable plastic and it includes a rear section 6 which is bent at an angle at 8 with respect to the remainder of the temple piece so as to fit over and partially around the wearer's ear. It is to be noted that the rear section 6 is generally of a rectangular cross-section, comprising two opposed narrow walls 10 and 12, and two opposed relatively broad walls 14 and 16. Wall 16 is visible only in FIG. 4. These four walls define a rectangular opening 20 at the extreme end of rear section 6. The purpose of opening 20 is to accommodate a battery drawer which is generally identified by numeral 22. The construction of this drawer is described more particularly hereinafter.

Mounted within the rear section 6 of the temple piece is a metallic bracket member generally identified at 24 (FIG. 4) which comprises a pair of side members 26 and 28 which are formed integral with a flat connecting section 30. Section 30 lies against and is secured firmly to the inside surface of wall 16 of the temple piece.

Secured to the flat connecting section 30 is an insulated post 32 which carries at its opposite end a resilient contact member 34. Also shown in the drawings is a miniature microphone 36 which also is mounted on the flat connecting section 30. It is to be understood that the microphone forms no part of the present invention and is illustrated solely to indicate that an auxiliary function of the bracket member 24 is to facilitate mounting of the microphone in the temple piece. In practice the microphone is mounted on the bracket member before it is inserted into the temple piece.

Drawer 22 comprises a pair of opposed sides 38 and 40 which are formed integral with a connecting bottom section 42. The sides and bottom are formed from a single piece of resilient electrically conductive material. Sides 38 and 40 lie inside of the corresponding sides 26 and 28 of bracket member 24, and the connecting bottom section 42 of the drawer is in sliding engagement with the flat section 30 of bracket member 24.

The drawer is slidably connected to bracket member 24 by a tongue and slot arrangement. The sides 38 and 40 of the drawer are formed at their forward ends with laterally directed tongues 44 which fit into elongated slots 46 formed in the adjacent side members 26 and 28. Although the length of slots 46 limits the extent to which the drawer can be pulled out, additional means are employed to help limit outward movement of the drawer and more particularly to prevent rotation of the drawer about an axis passing through tongues 44 and the outer ends of slots 46. These additional means comprise inwardly directed stops 48 formed on bracket side members 26 and 28 adjacent their outer ends, and upstanding lugs 50 formed on drawer sides 38 and 40 adjacent their inner ends. As seen best in FIG. 4, lugs 50 are blocked by stops 48 when the drawer is drawn to fully open position. As a result the drawer is prevented from falling out and is kept in coplanar alignment with the temple piece. However, the drawer may still be detached from the temple if it is desired to do so. All that is required to accomplish this is to squeeze or force drawer sides 38 and 40 toward each other just enough to free tongues 44 from slots 46 and slide lugs 50 around stops 48. Reinsertion of the drawer is accomplished in the same manner.

The drawer also includes a plastic end member 52 which has the same color as the temple piece proper. When the drawer is fully inserted within the temple piece, end member 52 will blend colorwise with the temple piece. At the same time end member 52 is curved as shown at 54 and 56 so as to function as a smooth continuation of the surfaces 10 and 12 of the rear section of the temple piece. However, in order to facilitate opening of the drawer, the plastic end member 52 is provided with slightly protruding narrow grooved sections 60 and 62. Sections 60 and 62 protrude just enough to be readily gripped between two fingers of the user, with the grooves providing a friction surface so that the fingers will not slip when exerting a pulling force on the drawer.

Stamped into bottom section 42 of the drawer is a relatively large plus (+) sign (see FIG. 4). This plus sign clearly indicates that battery B is to be mounted with its plus side against the bottom section 42 of the drawer. Of course, the sign would be of opposite polarity if the circuit connections are reversed. To eliminate shifting of the battery within the drawer, the bottom section 42 is provided with a pair of upturned ears 66 at its forward edge. When battery B is positioned within the drawer, ears 66 prevent it from moving away from the end member 52. Similarly, the opposite sides 38 and 40 prevent it from moving laterally.

The sides 26 and 28 of the metallic bracket member 24 are each provided with a pair of spaced holes 70 and 72. Cooperating with each pair of holes 70 and 72 is a detent or projection 74. Detents 74 are formed on each of the sides 38 and 40 of the drawer. When drawer 22 is pushed into the temple piece, detents 74 mate first with the holes 70 and then with the holes 72. The latter mating occurs only when the drawer is fully inserted. The important feature is that when detents 74 are locked in the holes 72, the flexible contact 34 will be in engagement with the top or negative side 78 of the battery. When the drawer is pulled out to the extent that the detens 74 can lock wih holes 70, the battery will be out of contact with the flexible contact 34. Thus, in effect, the drawer functions as a switch. When the drawer is fully inserted within the temple piece, the switch is closed and the battery is connected into the hearing aid circuit through contact 34 and bracket member 24. When the drawer is pulled out slightly, i.e., to the extent that the detents 74 are locked in holes 70, the switch is open and the battery is disconnected from the hearing aid circuit. It is to be noted that wires not shown are used to connect the flat section 30 of bracket 24 and the resilient contact 34 into the hearing aid circuit. These wires extend within the temple piece and are hidden from view.

It is to be noted also that the spacing between the two broad walls 12 and 14 of the temple piece is such that the battery will not rattle within the drawer. At the same time, wall 14 limits the extent to which the flexible contact 34 can shift out of the way of the battery. When the drawer is closed, battery B will engage the underside of contact 34. The latter will tend to yield out of the way of the battery, but it is prevented from doing so by wall 14 which maintains it in contact with the negative side of the battery. Battery B cannot be removed until detents 74 are released from holes 70 and the drawer is opened almost fully. Thereafter, the battery is removed simply by turning the temple piece over so that the battery will fall out of the drawer into the wearer's hand. Since the drawer can be opened at least halfway without the battery falling out, the user has an opportunity to determine whether the battery is facing up or down as the drawer is being pulled out. Hence, accidetnal dropping of the battery from the drawer can easily be avoided.

Another advantage of the illustrated construction is that the broad expanse offered by the connecting section 42 makes it possible to use a large plus sign marking so as to readily indicate to the wearer the required orientation of the battery B.

The switch construction is especially advantageous in that it permits the battery to be disconnected from the hearing aid circuit without removing it from the temple piece. The extent to which the drawer must be pulled out to disconnect the battery is relatively limited. Nevertheless, by visual inspection or by fingering the end of the temple piece, the user can readily determine whether the hearing aid is on or off.

Still another advantage of the illustrated construction resides in the fact that the end piece 52 of the drawer has a shape which conforms design-wise with the general shape of the temple piece. In this connection it is to be noted that when the drawer is fully closed, the edges of the end piece are disposed flush with the edges of the temple piece at the end opening 20. Furthermore, the grooved sections 60 and 62 do not protrude to the extent shown in the drawings where their relative size is exaggerated for the purpose of rendering them more distinct. As a result, the end piece complements the temple piece so as to enhance rather than detract from its beauty.

A further important advantage of the illustrated construction resides in the fact that the wall 16, which forms the side of the temple piece that lies against the wearer's head, is imperforate. As a result the battery compartment is completely sealed off against perspiration of the wearer. This is important since it helps prevent corrosion of metal parts and the battery, thereby extending their useful life.

Obviously, many modifications and variations of the present invention are possible in the light of the above teachings. Therefore, it is to be understood that the invention is not limited in its application to the details of construction and arrangement of parts specifically described or illustrated, and that within the scope of the appended claims, it may be practiced otherwise than as specifically described or illustrated.

I claim:

1. A plastic hearing aid temple-piece for a spectacles frame, said hearing aid temple-piece having a first hollow forward portion adapted to contain pre-selected components of a miniature hearing aid and a second hollow rear portion formed integral with said first portion, said second portion comprising four permanently-joined walls defining an end opening, a conductive metal member mounted within said second portion adjacent to said end opening, said metal member comprising a pair of flat parallel spaced side portions and a flat portion formed integral with and connecting said side portions, said side portions each extending inwardly from adjacent said end opening and each having an elongated slot extending through a substantial portion of its length, a battery drawer disposed within said second portion through said end opening, said drawer having two opposed sides and a bottom formed from a single piece of conductive metal, said drawer also having an end piece formed of the same plastic material as said first and second hollow portions, said two opposed sides located within said side portions with said bottom disposed in sliding contact with said flat connecting portion, said sides having outwardly extending tongues at their inner ends with said tongues disposed in said elongated slots whereby said slots cooperate with said tongues to slidably guide said drawer for movement into and out of said second portion, cooperating elements on said sides and side portions limting the extent to which said drawer may be opened, a detent formed in each side of said drawer, said side portions having first means for cooperating with said detents to lock said drawer in a first partially closed position and second means for cooperating with said detents to lock said drawer in a fully closed position, the sides and bottom of said drawer being fully hidden from view when said drawer is fully closed.

2. A plastic hearing aid temple piece as defined by claim 1, wherein said end piece has a shape compatible with the general shape of said temple piece whereby when said drawer is fully closed said end piece complements said temple piece with the edges of said end piece disposed flush with the edges of said temple piece at said end opening.

3. A plastic hearing aid temple piece as defined by claim 1 wherein said single piece of conductive metal is resilient, whereby said drawer may be released for removal from said rear portion by flexing said drawer sides toward each other an amount sufficient to free said tongues from said slots.

4. An eyeglass frame temple piece having a hollow section adapted to contain the elements of a hearing aid, said temple piece having an opening in one end defined by four permanently joined walls, a contact element in said temple piece, a longitudinally slidable battery drawer disposed within said temple piece through said opening having a conductive bottom section for engagement by one side of a battery disposed in said drawer, said conductive bottom section being conductively connected to a conductive metal member disposed within said temple piece at said one end, and means for locking said drawer in a first predetermined position whereby said contact is connected to said battery, means for locking said drawer in a second predetermined position whereby said contact is disconnected from said battery but said battery is still within said temple piece, and means for locating said drawer in a third predetermined position wherein said battery is outside of said temple piece, whereby it is removable from said drawer.

5. An eyeglass frame temple piece as defined by claim 4 wherein said means for locking said drawer in said first and second predetermined positions comprises detents formed in each side of said drawer.

References Cited in the file of this patent

UNITED STATES PATENTS

| | | |
|---|---|---|
| 2,731,586 | Born | Jan. 17, 1956 |
| 2,882,348 | Erickson | Apr. 14, 1959 |
| 2,916,538 | Rose | Dec. 8, 1959 |
| 2,930,857 | Hollingsworth | Mar. 29, 1960 |
| 2,952,748 | Posen et al. | Sept. 13, 1960 |